United States Patent
Wu (10) Patent No.: US 7,800,685 B2
(45) Date of Patent: Sep. 21, 2010

(54) METHOD OF AUTO FOCUS

(75) Inventor: Tung-Ying Wu, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 736 days.

(21) Appl. No.: 11/796,088

(22) Filed: Apr. 26, 2007

(65) Prior Publication Data

US 2007/0285557 A1    Dec. 13, 2007

(30) Foreign Application Priority Data

May 11, 2006    (TW) .............................. 95116719 A (51) Int. Cl.
*G03B 13/00*    (2006.01)
*H04N 5/232*    (2006.01)

(52) U.S. Cl. ...................... 348/345; 348/347; 348/348; 348/208.11; 348/208.12

(58) Field of Classification Search ................. 348/345, 348/347, 348, 208.11, 208.12; 396/121–125, 396/89–91, 131, 76–83
See application file for complete search history.

*Primary Examiner*—Yogesh K Aggarwal
(74) *Attorney, Agent, or Firm*—Thomas, Kayden, Horstemeyer & Risley (57) ABSTRACT

An auto focus method adapted to adjust relative positions between an optical system and a sensing unit so as to make an image surface lying in the depth of field is disclosed. The optical system includes at least a focusing lens. The method returns the focusing lens and the sensing unit to zero, change relative distances between the focusing lens and the sensing unit to evaluate evaluation values of lying the image surface in the depth of field, and adjusts towards the evaluation values until the image surface by the sensing unit lies in the depth of field to complete auto focus. When performing the task of auto focus, the driving unit only reverses once in shuttling runs. The auto focus method not only increases focusing speed, but also enhances precision and degree of wear resisting, which prolong lifetime of the apparatus.

16 Claims, 9 Drawing Sheets

METHOD OF AUTO FOCUS

RELATED APPLICATIONS

The application claims priority to Taiwan Application Serial Number 95116719, filed May 11, 2006, which is herein incorporated by reference.

BACKGROUND

1. Field of Invention

The present invention relates to a method of adapting or adjusting so that objects can be caught clearly. More particularly, the present invention relates to a method of auto focusing a photographic apparatus.

2. Description of Related Art

Figure 1:
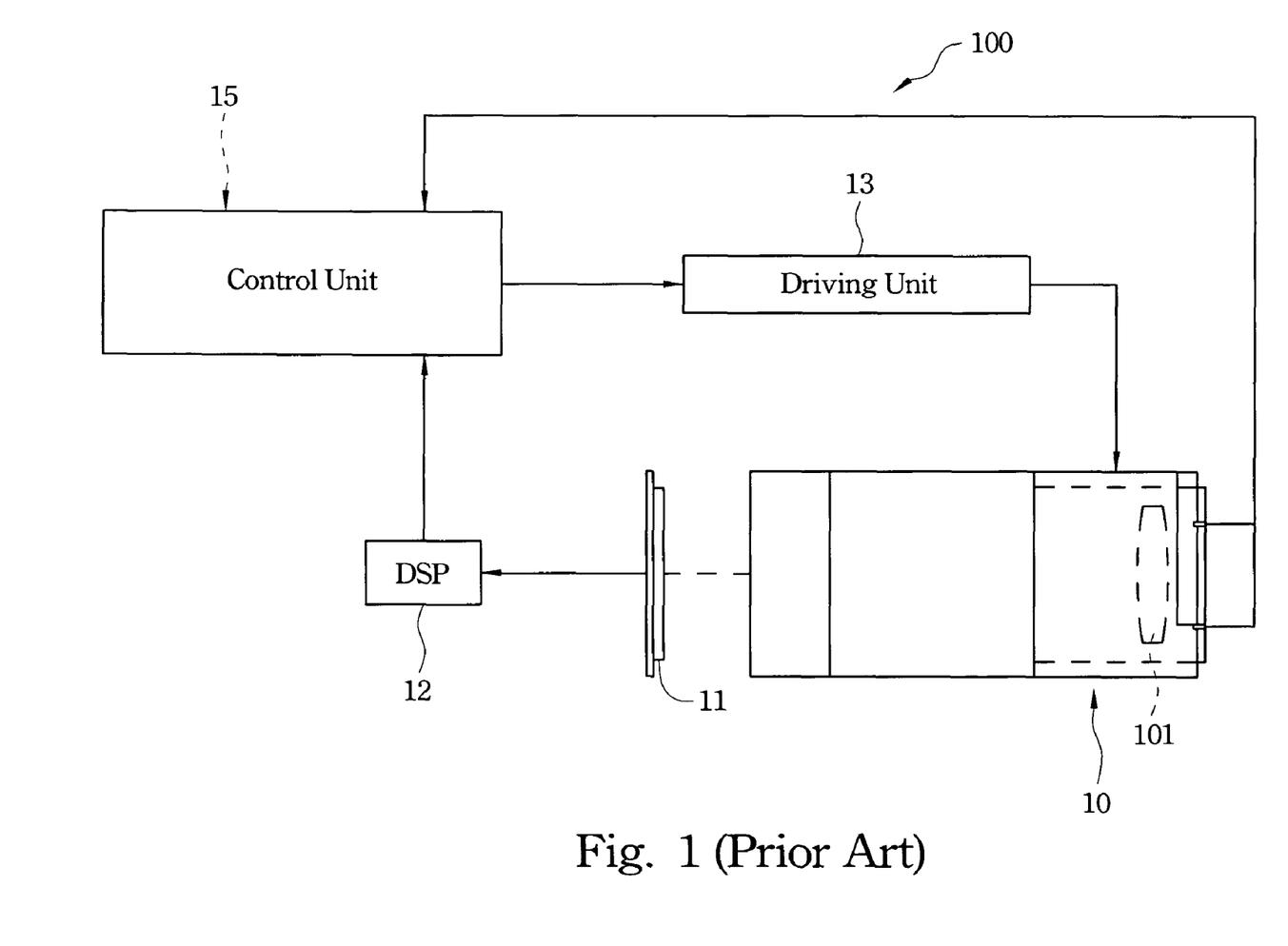
FIG. 1 is a block diagram of a photographic apparatus of in accordance with the prior art.
Figure 2:
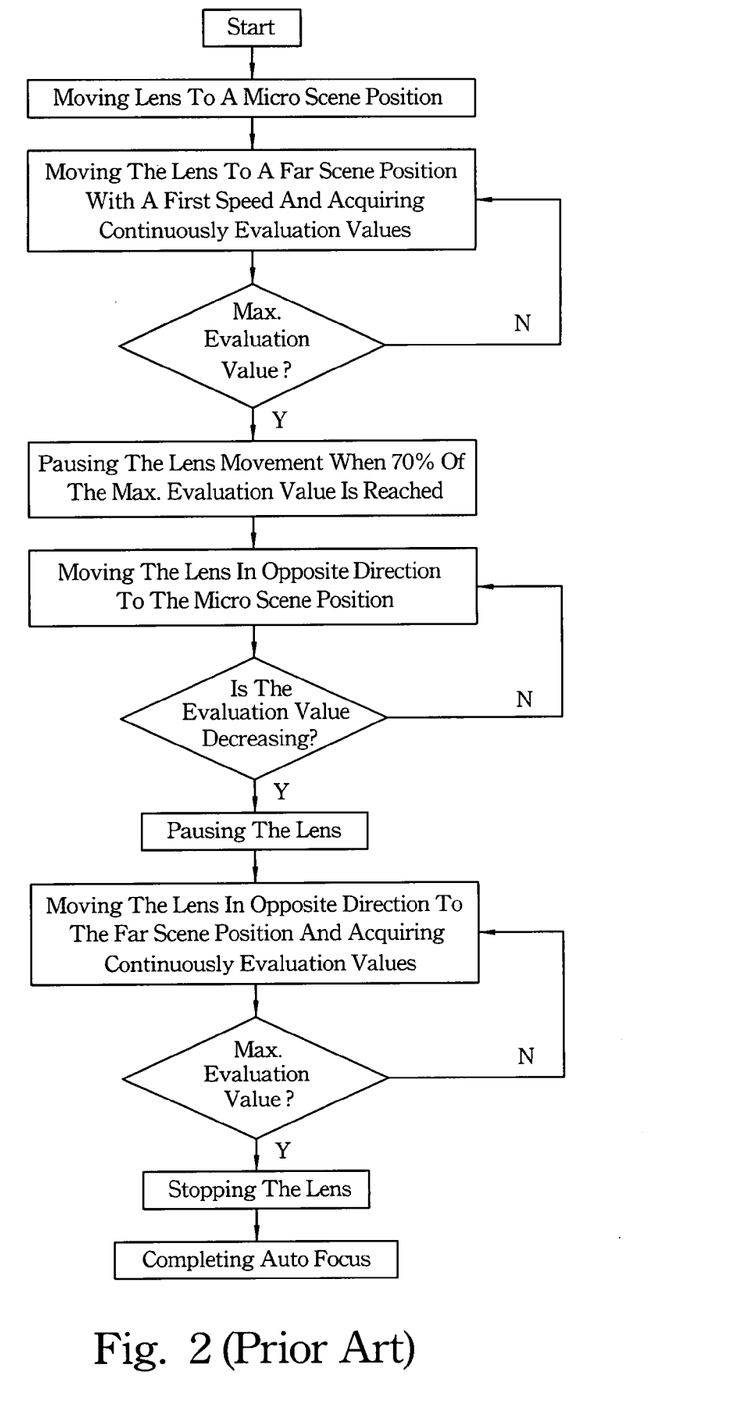
FIG. 2 is a flowchart of an auto focus method of in accordance with the prior art.
Figure 3:
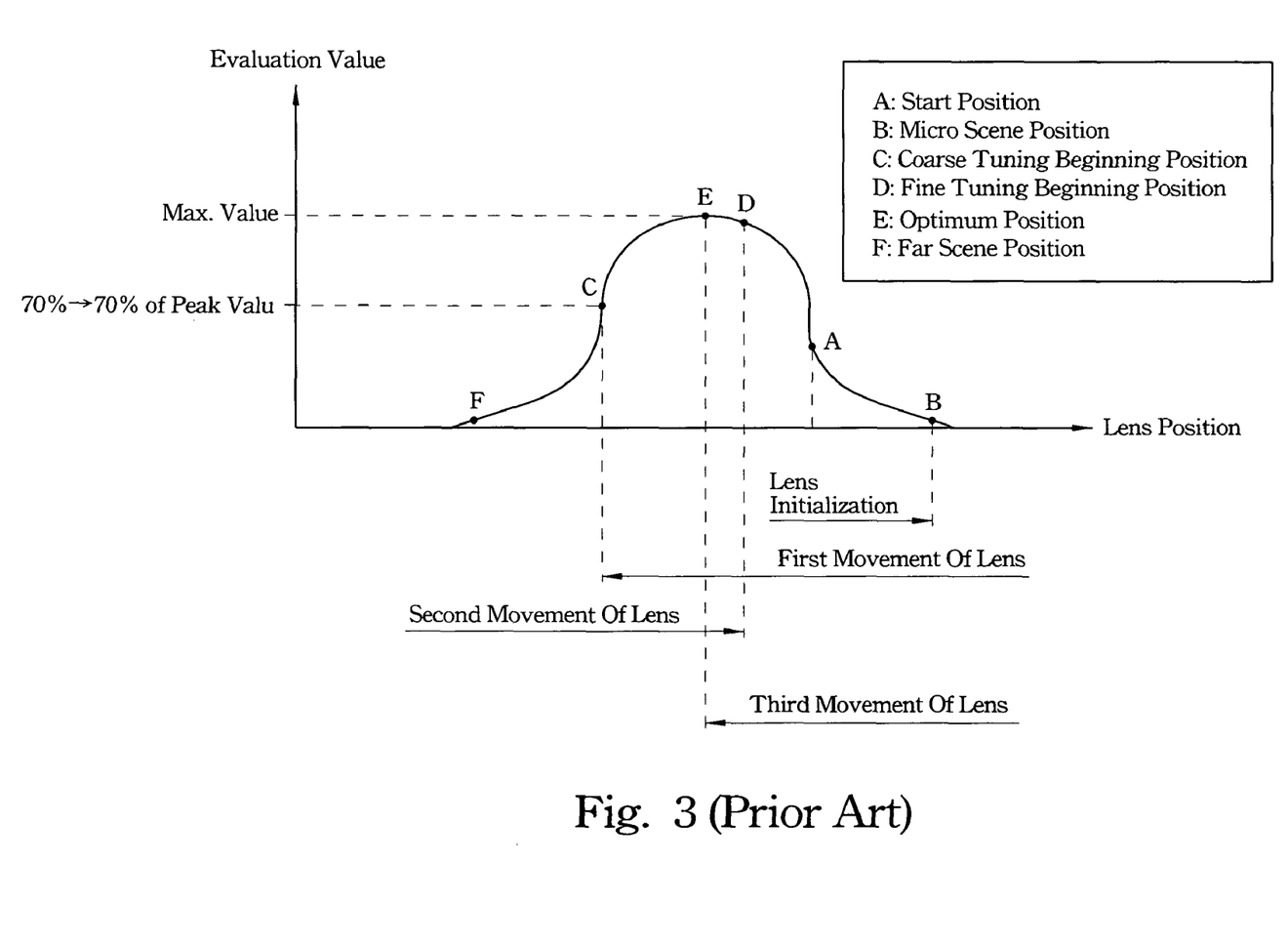
FIG. 3 is a curve chart illustrating the relationship between a pair of focusing lens and evaluation values in accordance with prior art.

Refer to FIG. 1, FIG. 2 and FIG. 3. Photographic apparatus 100 of digital cameras generally have an auto focus function to help a user to quickly catch an image surface lying within the depth of field. The photographic apparatus 100 includes a lens device 10 with a focusing lens 101, a sensing unit 11, a digital signal processor (DSP) 12, a driving unit 13 and a control unit 15. The driving unit 13 is connected to the sensing unit 11 and the focusing lens 101. The control unit 15 is electrically connected to the digital signal processor 12 and the driving unit 13.

The photographic apparatus 100 uses a method to focus the image surface lying within the depth of field, and the method comprises several steps:

(A) moving the focusing lens 101 to a micro scene position B to complete the initialization task regardless of a start position A (as shown in FIG. 3) when the photographic apparatus 100 is turned on.

(B) then, moving the focusing lens 101 towards a far scene position F at a first speed with the driving unit 13, and simultaneously obtaining multiple continuous optical singles and respectively converting those optical signals into evaluation values;

(C) comparing the evaluation values to acquire a maximum evaluation value by the control unit 15, and stopping the driving unit 13 when an evaluation value 70% of the maximum evaluation value is obtained, wherein the focusing lens temporarily stays at a coarse turning beginning position C.

(D) reversing the driving unit 13 at a second speed that is slower than the first speed to move the focusing lens 101 towards the micro scene position B and simultaneously obtaining the evaluation values until the evaluation values decrease and stop the motion, where the decrease of the evaluation values represents the focusing lens 101 has been moved over the maximum evaluation value and goes back to a previous area, and stays in a fine tuning beginning position D.

(E) reversing the driving unit 13 at a third speed that is slower than the second speed until a maximum evaluation value is substantially obtained again and stopping, where the focusing lens 101 stays in an optimum position E and completes auto focus operations.

Consequently, the aforementioned method helps the user quickly focus the image surface lying in the depth of field regardless of whether the scene being captured is a far scene or a micro scene when the user is trying to find a view. Manual observations with the eyes to manually adjust the focus are unnecessary, which avoids any operational deviations and time.

However, the aforementioned method still has some problems.

First, the traveling behavior of the focusing lens 101 is a shuttle run action as shown in FIG. 2 and FIG. 3. The five movement positions are A, B, C, D and E, and the B, C and D positions are transition positions. The focusing lens 101 needs to be moved in the opposite direction when it reaches the transition positions. Therefore, the driving unit 13 should be temporarily stopped, and then moves the focusing lens 101 towards the opposite direction. The shuttle run movement also wastes time and wears out the components thereby shortening the lifetime of the components and increasing the component failure rate.

Second, the focusing lens 101 moves between two positions E and D as shown in FIG. 3. The total distance moved by the focusing lens 101 is long, which thereby prolongs the focusing time.

Finally, the focusing lens 101 must return to the micro scene position B to perform the initialization operation when the users focus the photographic apparatus 100 each time. If the last picture shot scene that is far away, the start position A is inevitably closer to the far scene position F. However, if the scene currently being shot is still far away, the focusing lens 101 hardly performs the initialization operation with moving a short distance. Instead, the focusing lens 101 must return to the micro scene position B, which causes the focusing lens 101 to travel over a longer distance, consumes time and slow auto focus operations.

Besides, in practical operations, moving the focusing lens 101 exists backlash. The focusing lens 101 needs to move over a longer distance to compensate for the backlash. An increase in shuttling motions of the focusing lens 101 increases the influence of the backlash.

Therefore, there is a need to provide an improved auto focus method to mitigate or obviate the aforementioned problems.

SUMMARY

An object of the present invention is to provide an auto focus method that is faster and has a higher precision.

An auto focus method is adapted for a photographic apparatus to adjust the relative distance between an optical system and a sensing unit to catch an image surface lying in the depth of field. The photographic apparatus comprises the optical system, the sensing unit capturing an image of a target object through the optical system, a signal processor receiving signals generated by the sensing unit, a driving unit moving the optical system and the sensing unit, and a control unit electronically connected to the signal processor and the driving unit, wherein the optical system further comprises a focusing lens. The driving unit moves the focusing lens relative to the sensing unit to make the image surface traveled between a micro scene position and a far scene position. The method comprises steps of (A) moving the optical system and the sensing unit relative to each other by the driving unit to focus the image surface lying in either the micro scene position or the far scene position;

(B) moving the optical system and the sensing unit relative to each other at a first speed by the driving unit to adjust the image surface towards another one of the micro scene position and the far scene position, acquiring multiple optical signals by the sensing unit, and converting respectively the optical signals into multiple evaluation values and storing the evaluation values in the control unit by the signal processor;

(C) comparing the evaluation values by the control unit to find out a maximum evaluation value, and stopping the driving unit when one of the evaluation values decreases to a coarse tuning beginning that is obtained by multiplying the maximum evaluation value by a first proportional parameter;

(D) reversing the driving unit to relatively move the optical system or the sensing unit at a second speed and acquiring continuously the evaluation values until one of the evaluation values increases to a fine tuning beginning value that is obtained by multiplying the maximum evaluation value by a second proportional parameter; and (E) moving continuously and relatively the optical system or the sensing unit at a third speed and comparing simultaneously the evaluation values until a maximum evaluation value is substantially acquired, and completes the auto focus.

Consequently, when performing the auto focus task, the driving unit only reverses once to make the image surface lying in the depth of field by moving the focusing lens and the sensing unit. The traveling strokes of repeating motions have been reduced, which accelerates focus speed, eliminates backlash inaccuracy caused by the shuttling runs and enhances the precision of focusing.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 4:
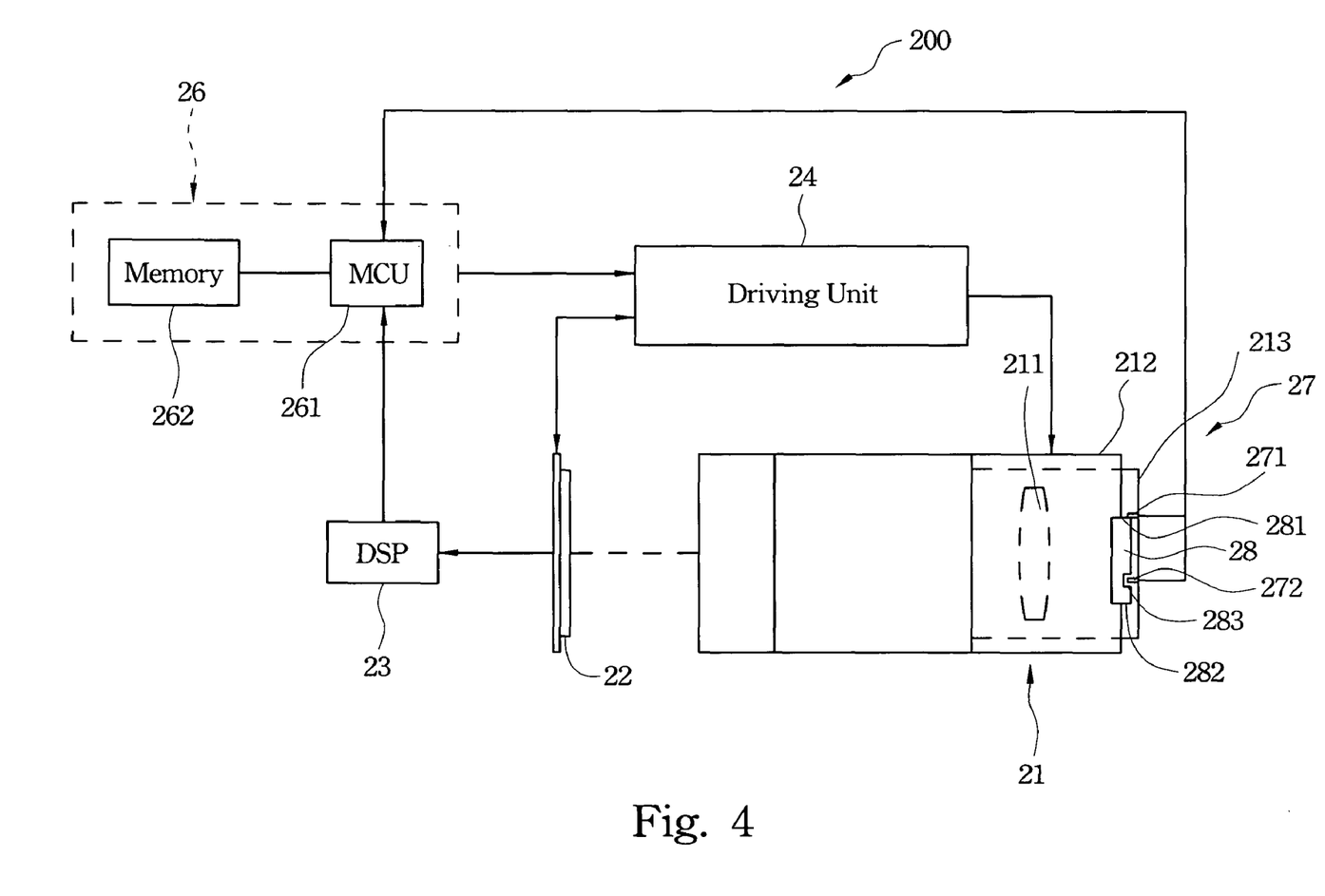
FIG. 4 is a block diagram of a photographic apparatus of an embodiment in accordance with the present invention.
Figure 5A:
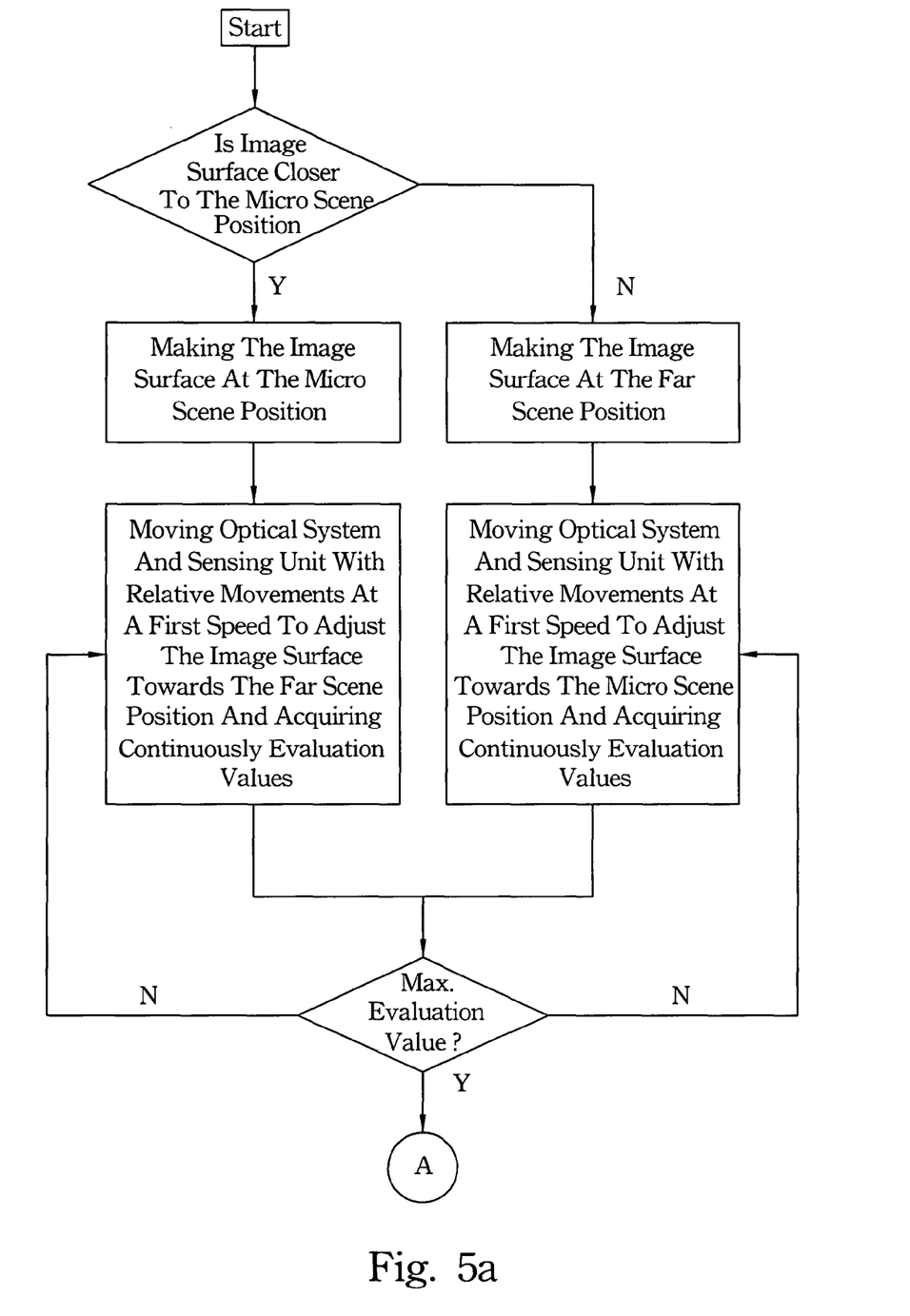
FIGS. 5a and 5b are flowcharts of an auto focus method of an embodiment in accordance with the present invention.
Figure 5B:
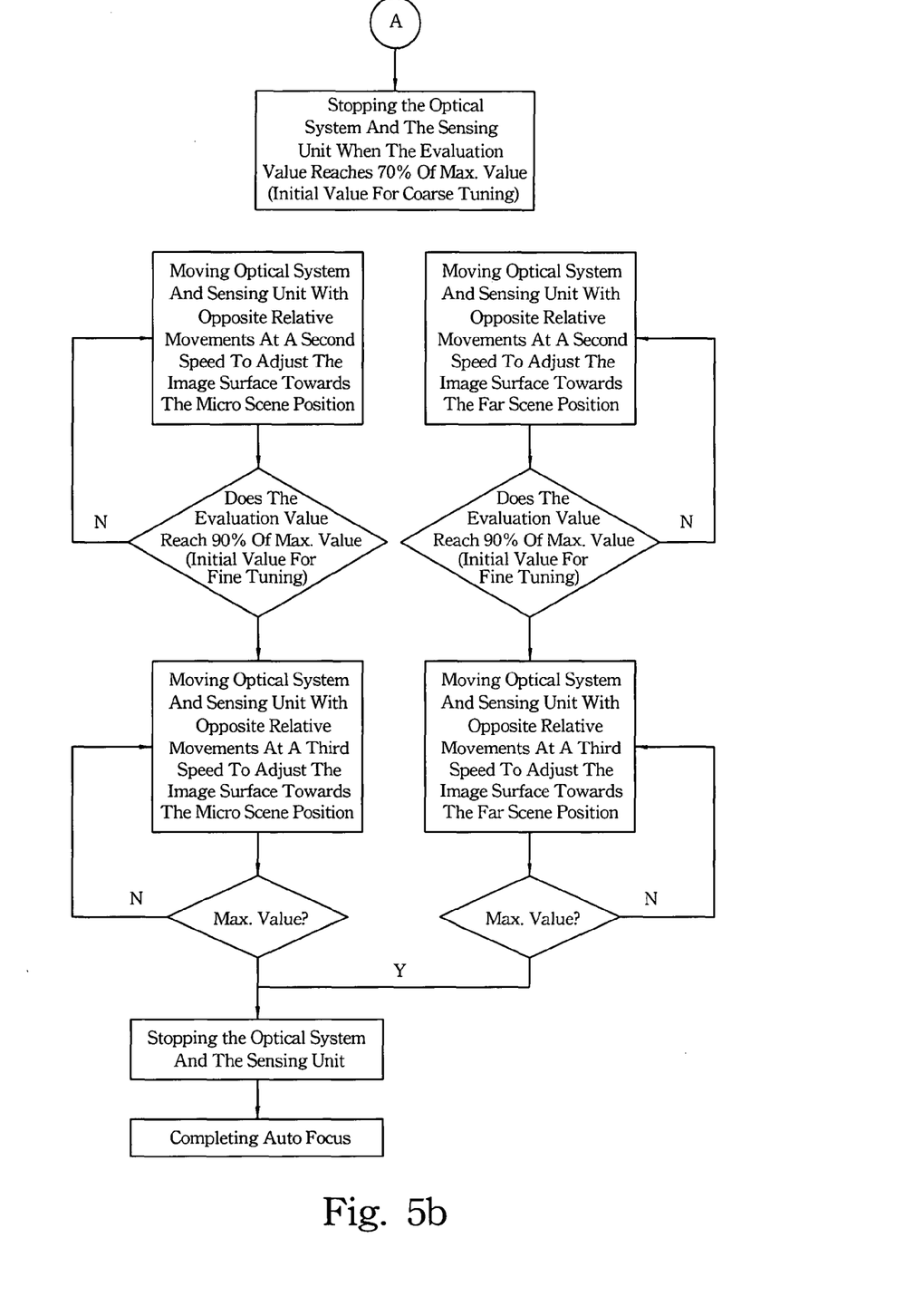
Figure 6:
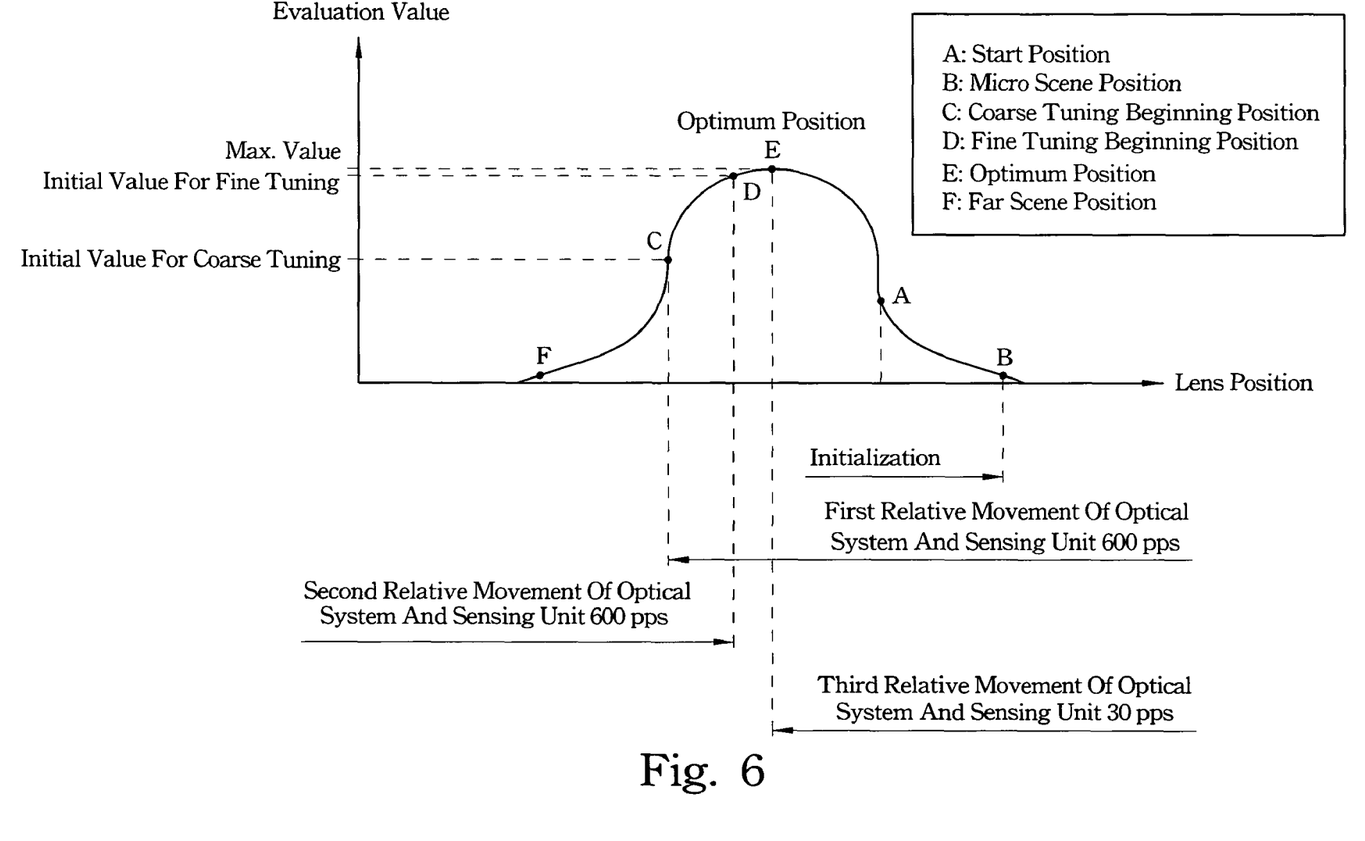
FIG. 6 is a curve chart illustrating the relationship between a pair of focusing lens and evaluation values.

Refer to FIG. 4, FIG. 5 and FIG. 6. An embodiment of an auto focus method in accordance with the present invention is used for a photographic apparatus 200 to adjust the relative position between an optical system and a sensing unit 22. The adjustment makes an image surface lie in the range of the depth of field. The photographic apparatus 200 comprises the optical system, the sensing unit 22, a digital signal processor 23, a driving unit 24, a control unit 26 and a position decoding module 27. Wherein the digital signal processor 23 receives electric signals of the sensing unit 22. Wherein the driving unit 24 moves the optical system or the sensing unit 22. The control unit 26 connects electrically to both the digital signal processor 23 and the driving unit 24. In the embodiment, the optical system comprises a lens assembly 21 comprising one or more than one focusing lens 211.

The sensing unit 22 may adopt a charge-coupled device (CCD), a complementary metal-oxide semiconductor (CMOS) or other photoelectric components to sense an image and converts it into the electric signals.

The digital signal processor 23 receives the electric signals of the sensing unit 22 to provide the control unit 26 to determine whether the imaging surface is lying in the range of the depth field.

The driving unit 24 may adopt stepping motor, coil driving unit or piezoelectric actuator to move relatively the focusing lens 211 or the sensing unit 22 to focus the photographic apparatus.

The control unit 26 comprises a microcontroller 261 and a memory 262. The memory 262 connects electrically to the microcontroller 261.

The position decoding module 27 comprises a micro scene sensor 271, a far scene sensor 272 and a shielding piece 28. The micro scene sensor 271 is mounted on a cone 212 of the lens assembly 21. The far scene sensor 272 is around mounted at a position apart from the micro scene sensor 271. The shielding piece 28 is around mounted on a rotation cone 213 of the lens assembly 21.

The micro and far scene sensors 271, 272 emit and receive light beams and are incorporated with the light beams shielded or passed through by the shielding piece 28 to sense.

The shielding piece 28 has a first end 281, a second end 282 and a through hole 283. The first end 281 is adjacent to the micro scene sensor 271. The second end 282 is adjacent to the far scene sensor 272 and is opposite to the first end 281. The through hole 283 is defined between the first end 281 and the second end 282. A distance between the through hole 283 and the first end 281 is substantially equal to the distance between the micro scene sensor 271 and the far scene sensor 272, and is equal to twice the distance between the through hole 283 and the second end 282. When the driving unit 24 moves the focusing lens 211 traveling between a micro scene position and a far scene position F, the driving unit 24 simultaneously rotates the rotation cone 213 and the shielding piece 28.

Figure 8:
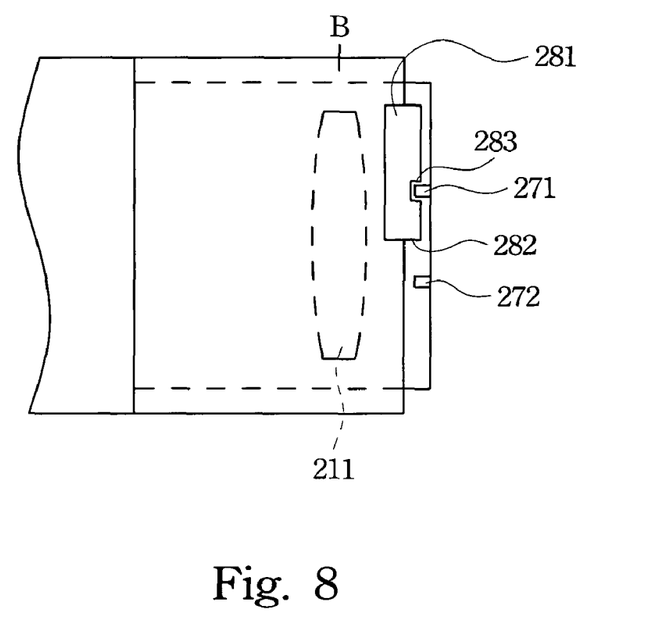
FIG. 8 is a schematic view of the focusing lens staying in a micro scene position.

Refer to FIG. 4 and FIG. 8. When the through hole 283 is aligned with the micro scene sensor 271, the micro scene sensor 271 outputs a penetrable signal so as to allow the control unit 26 to determine whether the focusing lens 211 stays in the micro scene position B.

Figure 7:
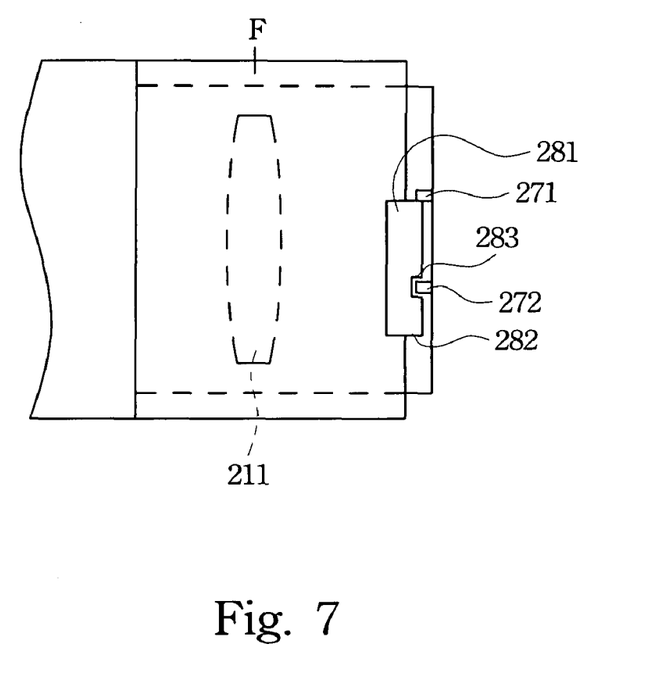
FIG. 7 is a schematic view of the focusing lens staying in a far scene position.

Refer to FIG. 4 and FIG. 7. When the through hole 283 is aligned with the far scene sensor 272, the far scene sensor 272 could output the penetrable signal so as to allow the control unit 26 to determine whether the focusing lens 211 stays in the far scene position F.

Figure 9:
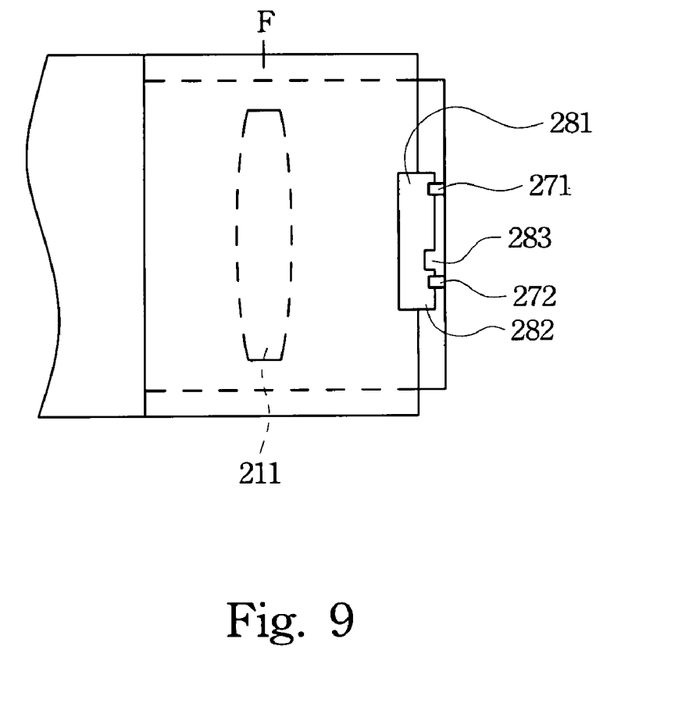
FIG. 9 is a schematic view of the focusing lens staying in a position closer to the far scene position.

Refer to FIG. 4 and FIG. 9. When the through hole 283 is located at a position between the micro scene sensor 271 and the far scene sensor 272, and the first end 281 and the second end 282 are respectively outside the micro scene sensor 271 and the far scene sensor 272, the micro scene sensor 271 and the far scene sensor 272 could respectively output shielding signals so as to allow the control unit 26 to determine if the focusing lens 211 stay in a position closer to the far scene position F.

Figure 10:
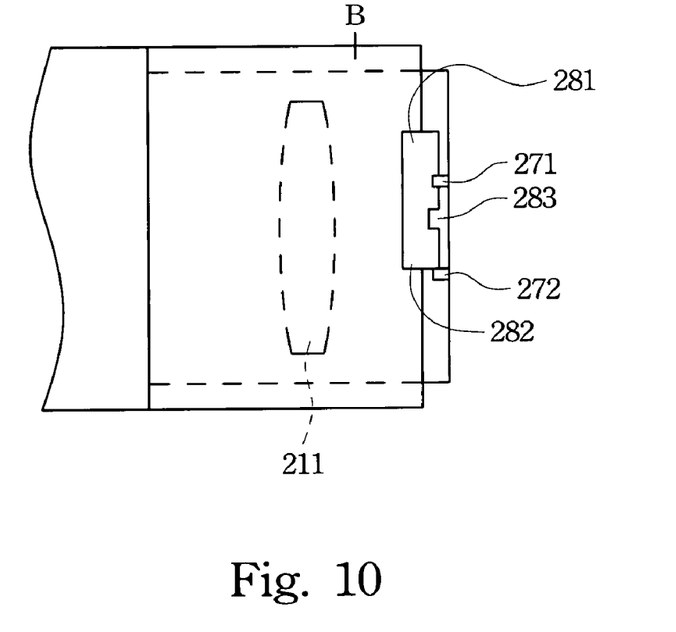
FIG. 10 is a schematic view of the focusing lens staying in a position closer to the micro scene position.

Refer to FIG. 4 and FIG. 10. When the through hole 283 and the second end 282 are located at positions between the micro scene sensor 271 and the far scene sensor 272, the micro scene sensor 271 and the far scene sensor 272 could respectively output a shielding signal and the penetrable signal so as to allow the control unit 26 to determine if the focusing lens 211 stay in a position closer to the micro scene position B.

Refer to FIG. 4, FIG. 5 and FIG. 6. The photographic apparatus 200 utilizes the auto focus method in accordance with the present invention to make the image surface lying in the depth of field to accelerate the speed and enhance the precision. The method comprises steps of (A0) determining a relative start position A of the focusing lens 211 and the sensing unit 22, and the image position is closer to the micro scene position B or the far scene position F. For example, the photographic apparatus 200 further comprises the micro scene sensor 271 and the far scene sensor 272. The control unit 26 determines the position of the focusing lens 211 being in the micro scene position B or the far scene position F through a signal outputted by the micro scene sensor 271 and the far scene sensor 272.

(A) moving relatively the focusing lens 211 and the sensing unit 22 by means of the driving unit 24 to adjust the image surface towards the closest one of the micro scene position B or the far scene position F so as to quickly complete the initialization task. In this embodiment, FIG. 6 illustrates that the relative start position A is closer to the micro scene position B. In this circumstance, moving either the focusing lens 211 or the sensing unit 22 relative to one another could make the image surface lying in the micro scene position B. Likewise, when the start position A is closer to the far scene position F, then the relative motion makes the image surface lying in the far scene position F. For convenient illustrating purposes only, the following steps take the embodiment shown in FIG. 6 for example.

(B) moving relatively the focusing lens 211 or the sensing unit 22 at a first speed to adjust the image surface lying in the far scene position by the driving unit 24 and acquiring continuous optical signals from the sensing unit 22, the optical signals are processed by the digital signal processor 23 that transforms those optical signals into evaluation values that are stored in the control unit 26. For example, the first speed may be pre-configured as 600 pps. The sampling rate of the sensing unit 22 may be 1/30 second to acquire the optical signals. The digital signal processor 23 transforms the optical signals into evaluation values using the modulation transfer function (MTF). The present invention is not limited to use the modulation transfer function.

(C) comparing the evaluation values from the control unit 26 to find a maximum evaluation value, and stopping the driving unit 24 when the evaluation values are decreasing where there is a coarse tuning position. For example, the beginning value of the coarse tuning position may be set by multiplying the maximum evaluation value by a first proportional parameter $\eta_1$. The first proportional parameter $\eta_1$ may be 70% to 80%. The present invention is not limited to the disclosure of 70% to 80%. The focusing lens 211 and the sensing unit 22 are stopped relative to each other in the coarse tuning position C of the image surface.

(D) moving relatively the focusing lens 211 or the sensing unit 22 at a second speed by reversing the driving unit 24, and acquiring continuous evaluation values until the evaluation values are increasing in a fine tuning beginning position C. The second speed is not greater than the first speed. In this embodiment, the second speed is 600 pps. For example, the fine tuning beginning value can be set as multiplying the maximum evaluation value by a second proportional parameter $\eta_2$ that is greater than the first proportional parameter $\eta_1$. The second proportional parameter $\eta_2$ may be 90%. The present invention is not limited to the disclosure of 90%. The focusing lens 211 and the sensing unit 22 are relatively stopped in the fine tuning position D of the image surface.

(E) moving relatively the focusing lens 211 or the sensing unit 22 at a third speed by reversing the driving unit 24, and comparing continuously the evaluation values until a substantial maximum evaluation value is acquired. The focusing lens 211 and the sensing unit 22 are relatively stopped in an optimum position E of the image surface (or the image surface lies in the depth of field), and the auto focus is completed. The third speed is smaller than the second speed. In this embodiment, the third speed is 300 pps.

Consequently, the focusing speed has been accelerated and the focusing precision has been enhanced through the aforementioned method. Further, the method also prolongs the life of the photographic apparatus.

Since the driving unit 24 is only reversed twice (positions B and C in FIG. 6) when the auto focus is performed, the image surface would be gradually adjusted into the optimum position E (the image surface lies in the depth of field). However, the prior art method needs to move the lens three times (respectively in positions B, C and D) in reversing the driving unit to adjust the image surface. Therefore, the present invention needs to be moved a less number of times to temporarily stop the driving unit. The performance has been increased by about one-third, time for focusing has been reduced, and component wear and tear has been reduced, which prolongs life of use and avoid breakdown.

When moving relatively the focusing lens 211 and the sensing unit 22 to focus a photographic apparatus, the image surface can be adjusted once from the fine tuning beginning position D to the optimum position E, and does not surpass the optimum position E towards the start position A. Therefore, traveling stroke of the movement is short, and the focusing time is quick.

The present invention determines the image surface being closer to either the micro scene position B or the far scene position F prior to performing the task of auto focusing. The focusing lens 211 and the sensing unit 22 would rapidly move towards the closest initialization position to complete the initialization operation. The focusing speed is accelerated. Besides, the user generally shoots far scenes or micro scenes in sequenced pictures. Therefore, using the closest initialization position to operate initialization accommodates for the user's habits for shooting pictures.

Since the number of times of reversing the driving unit 24 is less, and that last motion of the image surface that travels from the fine tuning beginning position D towards the optimum position E does not have any backlash while auto focusing, the present invention eliminates backlash and inaccuracy caused by the backlash so that the precision of focusing is improved.

Therefore, the auto focus method in accordance with the present invention not only increases focusing speed to satisfy the customer's demands, but also enhances the precision and degree of wear resisting, the method can be applied to any auto focus optical system to render products competitive.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An auto focus method for a photographic apparatus to adjust a relative distance between an optical system and a sensing unit to make an image surface lie in a depth of field, the photographic apparatus comprising the optical system, the sensing unit capturing an image of a target object through the optical system, a signal processor receiving signals generated by the sensing unit, a driving unit moving the optical system and the sensing unit, and a control unit electronically connected to the signal processor and the driving unit wherein the optical system further comprising at least a focusing lens, the driving unit moves the focusing lens relative to the sensing unit to make the image surface traveling between a micro scene position and a far scene position, and the method comprising (A) moving relatively the optical system and the sensing unit by the driving unit to focus the image surface lying in one of the micro scene position or the far scene position;

(B) moving relatively the optical system and the sensing unit at a first speed by the driving unit to adjust the image surface towards another one of the micro scene position and the far scene position, acquiring multiple optical signals by the sensing unit, and converting respectively the optical signals into multiple evaluation values and storing the evaluation values in the control unit with the signal processor;

(C) comparing the evaluation values by the control unit to find out a maximum evaluation value, and stopping the driving unit when one of the evaluation values decreases to a coarse tuning beginning value;

(D) reversing the driving unit to relatively move the optical system or the sensing unit at a second speed and acquiring continuously the evaluation values until one of the evaluation values increases to a fine tuning beginning value; and (E) moving continuously and relatively the optical system or the sensing unit at a third speed and comparing simultaneously the evaluation values until a substantial maximum evaluation value is acquired, and completing the auto focus;

wherein the coarse tuning beginning value in step (C) is obtained by multiplying the maximum evaluation value by a first proportional parameter.

2. The method as claimed in claim 1, wherein the first speed in step (B) is about 600 pps.

3. The method as claimed in claim 1, wherein the sensing unit has a sampling rate to acquire the optical signals in step (B).

4. The method as claimed in claim 3, wherein the sampling rate is 1/30 second in step (B).

5. The method as claimed in claim 1, wherein converting respectively the optical signals into multiple evaluation values in step (B) further comprises using a modulation transfer function (MTF) to calculate conversion.

6. The method as claimed in claim 1, wherein the first proportional parameter in step (C) is 70% to 80%.

7. The method as claimed in claim 1, wherein the first proportional parameter in step (C) is 70%.

8. The method as claimed in claim 1, wherein the second speed in step (D) is not greater than the first speed.

9. The method as claimed in claim 8, wherein the second speed in step (D) is 600 pps.

10. The method as claimed in claim 1, wherein the fine tuning beginning value in step (D) is obtained by multiplying the maximum evaluation value by a second proportional parameter.

11. The method as claimed in claim 10, wherein the second proportional parameter in step (D) is greater than the first proportional parameter.

12. The method as claimed in claim 11, wherein the second proportional parameter in step (D) is 90%.

13. The method as claimed in claim 1, wherein the third speed in step (E) is slower than the second speed.

14. The method as claimed in claim 13, wherein the third speed in step (E) is 30 pps.

15. The method as claimed in claim 1, further comprising a (A0) step before the (A) step, and the (A0) step comprising determining a relative start position of the focusing lens and the sensing unit, and the image surface being closer to the micro scene position or the far scene position and moving towards the closer one of the micro scene position and the far scene position.

16. The method as claimed in claim 15, wherein the (A0) step is implemented by a position decoding module that is electrically connected to the control unit to determine a relative start position of the focusing lens and the sensing unit, and the image surface being closer to the micro scene position or the far scene position, and the position decoding module comprising a micro scene sensor mounted on a cone of the focusing lens assembly;

a far scene sensor around mounted at a position apart from the micro scene sensor;

a shielding piece around mounted on a rotation cone of the focusing lens assembly and comprising a first end adjacent to the micro scene sensor;

a second end adjacent to the far scene sensor and opposite to the first end; and a through hole defined between the first end and the second end, wherein a distance between the through hole and the first end is substantially equal to the distance between the two sensors and is equal to twice the distance between the through hole and the second end;

wherein when the through hole is aligned with the micro scene sensor, the micro scene sensor outputs a penetrable signal and the control unit determines whether the focusing lens staying in the micro scene position;

wherein when the through hole is aligned with the far scene sensor, the far scene sensor outputs a penetrable signal and the control unit determines whether the focusing lens staying in the far scene position;

wherein when the through hole is located at a position between the micro scene sensor and the far scene sensor, and the first end and the second end are respectively outside the micro scene sensor, the micro scene sensor and the far scene sensor respectively output shielding signals and the control unit determines the focusing lens staying in a position closer to the far scene position;

wherein when the through hole and the second end are located at positions between the micro scene sensor and the far scene sensor, the micro scene sensor and the far scene sensor respectively output a shielding signal and a penetrable signal, and the control unit determines the focusing lens staying in a position closer to the micro scene position.

* * * * *